United States Patent [19]

Thompson et al.

[11] Patent Number: 4,561,500

[45] Date of Patent: * Dec. 31, 1985

[54] METHOD OF ENHANCING OIL RECOVERY BY USE OF EXOPOLYMER-PRODUCING MICRO-ORGANISMS

[75] Inventors: Bradley G. Thompson, Edmonton; Thomas R. Jack, Calgary, both of Canada

[73] Assignee: Nova/Husky Research Corporation Ltd., Alberta, Canada

[ * ] Notice: The portion of the term of this patent subsequent to Jul. 17, 2001 has been disclaimed.

[21] Appl. No.: 561,985

[22] Filed: Dec. 16, 1983

Related U.S. Application Data

[63] Continuation-in-part of Ser. No. 405,371, Aug. 5, 1982, Pat. No. 4,460,043.

[30] Foreign Application Priority Data

Aug. 15, 1983 [CA] Canada ................................ 433952

[51] Int. Cl.$^4$ .............................................. E21B 43/22
[52] U.S. Cl. .................................................... 166/246
[58] Field of Search ............... 166/246, 273, 274, 270, 166/292, 294; 435/101, 104, 105, 262, 281, 832, 885, 859; 252/8.55 D

[56] References Cited

U.S. PATENT DOCUMENTS

| | | | |
|---|---|---|---|
| 2,807,570 | 9/1957 | Updegraff | 435/281 X |
| 3,326,286 | 6/1967 | Harvey | 166/274 |
| 3,340,930 | 9/1967 | Hitzman | 166/246 |
| 3,598,181 | 8/1971 | Wegner et al. | 166/246 |
| 3,650,326 | 3/1972 | Hitzman | 166/246 |
| 3,655,512 | 4/1972 | Tanaka et al. | 435/105 |
| 3,965,985 | 6/1976 | Hitzman | 166/275 |
| 4,096,073 | 6/1978 | Hitzman | 166/273 |
| 4,119,546 | 10/1978 | Wernau | 266/246 X |
| 4,128,482 | 12/1978 | Knight | 166/246 X |
| 4,352,741 | 10/1982 | Wernau | 166/246 X |

FOREIGN PATENT DOCUMENTS

| | | | |
|---|---|---|---|
| 1079947 | 6/1980 | Canada | 166/246 |
| 1085600 | 9/1980 | Canada | 166/246 |
| 1119794 | 3/1982 | Canada | 166/246 |
| 0140067 | 2/1980 | Fed. Rep. of Germany | 166/246 |
| 0089580 | 11/1958 | Netherlands . | |

*Primary Examiner*—Stephen J. Novosad
*Attorney, Agent, or Firm*—Cushman, Darby & Cushman

[57] ABSTRACT

A method of controlling and selectively reducing the permeability of zones in an oil-bearing underground formation which have higher permeabilities than the surrounding zones by injection of exopolymer producing microorganisms into the oil-bearing formation is described. The exopolymer production of the microorganisms used in the method is controlled by regulation of the availability to the microorganisms of a compound such as sucrose which triggers exopolymer production.

51 Claims, 7 Drawing Figures

▲ POLYMER 'OFF' (MEDIUM CONTAINS GLUCOSE AND FRUCTOSE)
● POLYMER 'ON' (MEDIUM CONTAINS SUCROSE)

METHOD OF ENHANCING OIL RECOVERY BY USE OF EXOPOLYMER-PRODUCING MICRO-ORGANISMS

This application is a continuation-in-part of Ser. No. 405,371 filed Aug. 5, 1982, now U.S. Pat. No. 4,460,043.

The invention relates to the enhanced recovery of mineral oil from underground oil reservoirs, more particularly to a method of controlling and selectively reducing the permeability of zones in an oil-bearing underground formation which have higher permeabilities than the surrounding zones by use of exopolymer producing bacteria.

In the recovery of oil from oil-bearing reservoirs, it is often possible to recover only a portion of the oil contained in the underground formation by the so-called primary recovery methods which utilize the natural forces present in the reservoir. Thus a variety of enhanced recovery techniques, so-called secondary or tertiary recovery, have been employed in order to increase the recovery of oil from subterranean reservoirs.

In one form of the enhanced recovery of oil, a drive fluid is injected under pressure into the oil reservoir through one or more injection wells to maintain, restore or produce formation pressure. The most widely used drive fluid is water, however, more complex aqueous systems, solvents and gases are also useful as drive fluids. The drive fluid is frequently introduced into the oil-bearing underground formation near the bottom of the formation at or above formation pressure, to displace oil in the reservoir. As the fluid moves through the reservoir, it drives or flushes the oil through the formation. An increased oil saturation develops ahead of the moving fluid and finally reaches the production well or wells.

Generally, an oil-bearing underground formation will consist of various regions having different permeabilities. Drive fluid moving through the reservoir preferentially moves to and through regions of higher permeability, fractures and the like. In this way channels tend to form. This phenomenon is generally called channelling or fingering. Drive fluids will pass predominantly through such channels bypassing regions of lower permeability and, thus, bypassing oil contained in such lower permeability regions. This obviously reduces the sweep efficiency of the displacing medium.

It has been suggested that certain types of bacteria which produce extra-cellular slime and/or biopolymers and which grow and reproduce under the conditions found in oil reservoirs are effective in reducing the permeability of underground formations. In many cases such actively slime and/or biopolymer producing bacteria present a problem on injection into the well in that they tend to plug the supply pipes, the walls of the well bore, etc. Furthermore, injection of such bacteria into a reservoir tends to reduce the permeability of higher as well as lower permeability zones in the reservoir unless the bacteria can be accumulated predominantly in the higher permeability zones before the bacterial cells form sufficient slime or biopolymer to considerably lower the permeability of the reservoir area.

In order to minimize plugging on injection as well as indiscriminate reduction of the permeability of the oil-bearing formation, the slime and/or biopolymer formation by the microorganisms has to be controllable before and particularly during and after injection until the microoroganisms are moved to the regions the permeability of which has to be reduced.

In the following the term "slime" is used for extra-cellular excretions of microorganisms. The excretions comprise polymeric materials which are associated with the cell surface.

The term "biopolymer" is used for constituents of slime which can be totally dissociated from the cells. The term "exopolymer" is used to designate extra-cellularly formed biopolymers as well as slime.

Selective experiments have led to the discovery and isolation of several strains of exopolymer-producing obligate or facultative anaerobic microorganisms in which the exopolymer production can be controlled. The microorganisms used in the method according to the invention may be isolated from field samples which may be taken from sources such as oil field waters, marine muds, compost, anaerobic pulp mill sludges, etc. The microorganisms are selected for their ability to produce exopolymers, in particular substantially insoluble exopolymers, in the presence of a "trigger compound", which triggers exopolymer production in the respective microorganism, while producing little or no exopolymers in the absence of the trigger compound. In microorganisms so selected the production of exopolymer can be controlled.

Exopolymer production is substantially suppressed by keeping the bacterial culture free of the trigger compound and is triggered by adding the trigger compound to the microorganism culture. The microorganisms are further screened for their ability to grow and, when the trigger compound is present, to produce exopolymers under the conditions found in oil reservoirs, particularly in reservoirs containing heavy oil. The recovery of heavy oil generally requires enhanced recovery techniques such as water flooding of the reservoir and, channelling occurs more frequently in the recovery of heavy oils than in the recovery of other types of oil. Moreover, heavy oil in most cases occurs in shallow formations so that the temperatures and pressures in the formations bearing heavy oil are generally not particularly high.

In the case of heavy oil, the aim is not to control the mobility of the drive fluid such as water by increasing its viscosity through polymer production, as has been proposed previously, particularly for the enhanced recovery of other types of oil, but to actually plug channels with a matrix of biomass and exopolymer. For such purpose substantially insoluble exopolymers are required.

Accordingly, the present invention provides a method of reducing in an oil-bearing underground formation the permeability of zones in the formation which have a higher permeability than surrounding zones. The method comprises:

(a) injecting into the underground formation microorganisms capable of producing substantially insoluble exopolymer in the presence of a trigger compound and capable of growing under conditions of oil-bearing underground formations. The microorganisms, which are in an aqueous medium substantially free of said trigger compound, are injected such that they accumulate in the higher permeability zones.

(b) injecting the trigger compound into the underground formation so as to enhance production of exopolymer by the microorganisms, whereby the exopolymer reduces the permeability of the higher permeability zones.

The microorganisms which are used for injection according to the inventive method are grown under conditions of temperature, pH, $E_H$, salinity, etc. which are similar to the conditions generally found in oil-containing reservoirs. Accordingly, the microorganisms are obligate or facultative anaerobic strains which advantageously can withstand salinities of 5% and higher which is typical of the brine present in many oil reservoirs. Since the effect of pressure on microorganisms is generally minimal up to pressures of about 7,000 psi (50,500 kP), the pressure of most oil-bearing formations would not critically affect the performance of the present microorganisms.

The aqueous growth medium in which the microorganisms which are used for injection into the underground formation are grown and maintained is substantially free of trigger compound. The term "growth medium substantially free of trigger compound" includes growth media which do not contain any trigger compound as well as growth media which contain trace amounts of trigger compound. In microorganisms in which the enzyme system involved in producing the exopolymer is an inducible rather than a constitutive enzyme system, it is often advantageous to grow the microorganism in a growth medium which contains a small amount of trigger compound so as to pre-induce the exopolymer-forming enzyme system in the microorganism. When trigger compound is added to initiate exopolymer production the rate of exopolymer production is greater in mircoorganisms thus pre-induced than it is in the same microorganisms not pre-induced. On the other hand, it has to be taken care that the amount of trigger compound present in any growth medium which is intended to pre-induce the exopolymer-forming enzyme system is sufficiently small so as not to support production of any noticeable amount of exopolymer, since this could cause plugging or could othwerwise interfere with the injection of the microorganism into the well.

Microorganisms which are preferred for use in the method according to the invention are bacterial strains which produce substantially insoluble exopolymer, the production of which is triggered by sucrose.

Certain strains of the *Leuconostoc* species have been found to produce substantially insoluble exopolymer the production of which is controlled by the availability of sucrose. Preferred strains are *Leuconostoc mesenteroides* strains which may be obtained from the Northern Regional Research Laboratories (NRRL) of the U.S. Department of Agriculture, Peoria, Ill. These strains produce a dextran exopolymer the production of which is controlled by sucrose. Examples of *Leuconostoc mesenteroides* strains which may be used in the method according to the invention either as substantially pure strains or as mixtures of two or more strains are *Leuconostoc mesenteroides* NRRL B-523, B-1118, B-1120, B-1121, B-1139, B-1144, B-1149, B-1299, B-1355, B-1431, B-1433, B-1433-A, B-1438 and B-1438-A. In the following the use of these preferred bacterial strains in the inventive method is described. However, other microorganisms, the exopolymer production of which can be controlled and which are selected according to the criteria described above, may also be used in the inventive method.

As water is the drive fluid most commonly used, the following processes are generally described as applied in the enhanced recovery of oil using water. However, the inventive process may also be applied in the enhanced recovery of oil using drive fluids other than water.

As mentioned above the enhanced recovery of oil in which water is injected into one or more injection wells may lead to the formation of channels or so-called "thief" zones. Thus, the ratio of oil to water recovered in the production wells may decrease due to the fact that the water bypasses oil-bearing regions of lower permeability. In such cases bacteria, generally a single substantially pure strain, selected as described above, are grown in a growth medium substantially free of sucrose, so that the bacteria produce very little or no exopolymer, and under the conditions of the reservoir into which they are to be injected. The term "substantially sucrose-free medium" encompasses media which are effectively sucrose-free as well as media which contain sucrose in an amount which is sufficient to pre-condition the bacteria for subsequent exopolymer production but not sufficient to allow any noticeable formation of exopolymer. In bacteria which produce the enzyme system involved in the formation of exopolymer only in the presence of sucrose, the presence of small amounts of sucrose in the growth medium generally leads to pre-conditioning of the bacteria by inducing the formation of this enzyme system. Accordingly, once sucrose is added bacteria in which the enzyme is inducible and which have been pre-induced exhibit a higher rate of exopolymer production than bacteria of the same kind in which the enzyme is not pre-induced.

In the case of the bacterial strain *Leuconostoc mesenteroides* NRRL B-523 the exopolymer production is triggered by sucrose, the exopolymer produced is substantially insoluble dextran and the enzyme involved is dextransucrase. The latter has been found to be an inducible enzyme. When this strain is grown in the presence of about 0.001 to 0.04% of sucrose in the growth medium, the bacteria become pre-conditioned such that, when sucrose is added to initiate dextran production, the pre-conditioned bacteria show a considerably higher rate of dextran production than bacteria of this strain which were grown in the same growth medium but in the absence of any sucrose. Even though an amount of 0.001 to 0.04% of sucrose in the growth medium pre-conditions this strain for subsequent dextran production, this small amount of sucrose does not allow formation of any noticeable amount of dextran which would interfere to any considerable extent with the injection of the bacteria into the formation.

The bacterial culture suspended in a substantially sucrose-free aqueous medium such as a growth medium, oil field brine or the like is injected into the reservoir at or above formation pressure. It is advantageous to inject the bacterial culture while it is still in the stage of exponential growth. Moreover, it is in many cases desirable to adjust the density of the bacterial culture for injection such that the cell concentration in the underground formation is in the range of between about $10^4$ and $10^9$ cells/mL, preferably between about $10^7$ and $10^9$ cells/mL.

Thus, during the injection process according to the invention the production of exopolymer by the bacteria is controlled by injecting the bacterial culture in a medium which supports growth of the bacteria without inducing any substantial exopolymer formation. In this way, plugging of the well bore can usually be avoided and the accumulation of the bacteria in the higher permeability zones of the oil-bearing formation can be effected as described in more detail hereinafter.

During the injection process according to the invention it must be taken care that (a) excessive shear forces or pressure differentials are avoided in order to preserve maximum viability of the bacterial culture; (b) at injection pressure the bacterial culture will not form gas bubbles to any considerable extent, since occurrence of such bubbles in the well bore generally leads to a considerable loss of injectivity; and (c) the bacterial cells will not form extensive chains, clumps or other aggregations, since these tend to lead to plugging of the well bore.

According to the invention the bacterial slurry is generally injected in the same way as the water used for flooding. In this way the bacteria enter predominantly higher permeability zones and channels developed during the water flooding process, since these are the areas of least resistance to the incoming slurry. Usually, relatively small quantities of the bacterial slurry disperse into other areas of the reservoir and, consequently, only small amounts of bacteria settle in those areas. It is generally advantageous to use bacteria which do not spontaneously adhere to the rock and/or sand surfaces of the reservoir. In this way the bacteria pass more easily into the channel areas.

In cases where the areas of higher permeability which are to be plugged are located close to the point of injection, the injection of the bacterial slurry may directly be followed by the injection of sucrose. If, on the other hand, the areas which are to be plugged are more remote from the point of injection, the bacterial slurry may be transported to the desired zones by the injection of water and/or by the injection of an aqueous medium containing nutrients which can enhance in situ growth of the bacteria in the reservoir without inducing any noticeable exopolymer production. In this way most of the bacterial slurry can be moved into the higher permeability zones of the formation.

In order to trace the movement of the bacterial slurry through the formation, the flow of water from the injection well to the production well is timed by the addition of tracers such as radioisotopes with short half lives, nitrates or other chemicals. In this manner the rate of travel of the bacterial slurry through the formation can be estimated.

Once the bacteria reach the zones which require plugging, sucrose in an aqueous medium, preferably a growth medium, is injected via the injection well through which the bacterial slurry was introduced previously. A convenient sucrose medium is an aqueous solution of sugar beet or sugar cane molasses, since molasses does not only contain the required sucrose but also contains the nutrients necessary to support bacterial growth. As soon as the aqueous sucrose medium, which may have a sucrose concentration of up to about 35%, preferably about 10% to 20% (w/v), reaches the bacteria in the formation, the bacteria start the production of exopolymer. At this point pumping is generally discontinued to allow the bacteria to accumulate exopolymer in the desired area of the formation. This accumulation of exopolymer will reduce the permeability of that area. If sufficient sucrose is provided the exopolymer will accumulate to such an extent as to plug the areas of the formation in which the bacteria are located with a plug consisting of a matrix of bacterial cells and exopolymer. If the sucrose medium contains nutrients supporting the growth of the injected bacteria, the bacteria continue to grow thus producing more cells and more exopolymer and plugging the surrounding area at a faster rate.

Alternatively the sucrose medium may be injected via one or more of the production wells. In this case production of exopolymer will be limited to the region of overlap, i.e. to the area where the bacteria, which move into the formation from the injection well, and the sucrose medium, which moves into the formation from the production well, mix. The latter procedure may be of particular interest in cases when it is difficult to limit spread of the bacteria to the areas of high permeability.

In some cases it may be more efficient to introduce the bacterial slurry into the production well and then inject the sucrose medium either into the production well or into the injection well.

When subsequent water flooding is resumed, the flow of injected water through the higher permeability zones is reduced or even blocked mainly due to the exopolymer produced in these zones, but partially also due to the increase in the number of bacterial cells. As a consequence the sweep efficiency of the water for surrounding oil-rich zones of lower permeability is increased and the amount of water coproduced with the oil at the production well is reduced. The "plugs" of exopolymer and bacterial cells withstand the pressures generally involved in water flooding.

Extracellular slime and/or biopolymers may be composed of polysaccharides and/or protein. The exopolymers formed by the bacteria which are preferred for use in the method according to the invention comprise polymeric derivatives of sucrose which contain glucose and/or fructose as major constituent and which are substantially insoluble in the drive fluid. A preferred strain of bacteria, *Leuconostoc mesenteroides* B-523, for example, produces dextran.

According to the invention the microorganisms may be selected for use in reservoirs with temperatures of between about 10° and 70° C., salinities of up to 9%, a pH of between 3 and 9 and pressures of up to 7,000 psi.

Examples of drive fluids suitable in connection with the method of the present invention are, besides water, aqueous systems such as microemulsions of water in hydrocarbons or hydrocarbons in water, micellar suspensions and the like as well as certain gases.

The inventive method of reducing the permeability of zones which have a relatively high permeability by controlled introduction and growth of exopolymer producing microorganisms into such zones may also be applied to selectively plug undesireable fractures in a geological formation. As fractures constitute areas of high permeability, sealing of fractures often becomes necessary when drive fluid moving into such fractures forms channels or when such fractures connect the oil-bearing formation with a water-bearing formation such as an active aquifer allowing undesired water to enter into the production zone.

The invention may also be applied to "bottom water" reservoirs wherein the production zone overlies an aquifer so that the pumping of oil from the production zone also draws water from underlying aquifers through "coning". In such cases injection of the bacterial system followed by the injection of sucrose into the aquifer and/or its channels to the production well may, by plugging such channels substantially reduce the amount of water produced together with the oil.

EXAMPLE 1

Isolation and Identification of Bacterial Strains

From sources such as garden compost, contaminated Clostridium cultures and an open oil pit sump several strains of bacteria were selected and screened by known methods, for their ability to produce an exopolymer in the presence of sucrose, and to grow under conditions similar to the conditions of the Golden Lake oil field at Lloydminster, Alberta, i.e. at a temperature of between about 10° and 38° C., a salinity of up to about 6.5%, and a pH of between 3 and 8, anaerobically, and in the presence of heavy oil.

Five bacterial strains having the above-mentioned properties were isolated. These strains are listed in Table 1.

Standard tests have shown that all five of these strains are Gram-positive cocci. Though the identification of the strains has not yet been completed, it is believed that the five strains can be assigned to one of the following families of bacteria: Micrococcaceae, Streptococcaceae or Peptococcaceae.

Known identification procedures showed that strain 18-1 is a facultative anaerobic, catalase-negative, Gram-positive coccus capable of producing in the presence of sucrose a glucose based exopolymer. Tentatively this strain is assigned as a Leuconostoc species of the Streptococcaceae family.

During the procedures for isolating the five bacterial strains listed in Table 1 a number of exopolymer forming Gram-positive rods were discovered. These rods may belong to the Bacillaceae or Lactobacillaceae families.

TABLE 1

| Exopolymer Producing Bacteria | |
|---|---|
| Source | Bacterial Strain |
| Garden Compost | 18-1 |
| Contaminants | 824-1 |
| of Clostridium | 8529-1 |
| cultures | 527-3A |
| Open oil pit sump | 5-1 |

EXAMPLE 2

Control of Exopolymer Formation

To determine whether the exopolymer formation of each of the five strains listed in Table 1 is controllable by altering the composition of the growth medium, the following experiment was performed.

The five bacterial strains that produce exopolymer on solid 2% agar media were grown anaerobically at 35° C. in a liquid medium of the composition shown in Table 2 containing 1.0% sucrose or 0.5% fructose and 0.5% glucose. The bacteria were grown to a final cell concentration of $3 \times 10^8$/mL.

The amount of carbohydrate based exopolymers produced was determined by a modification of the procedure of Ingelman and Halling (B. Ingelman and M. S. Halling: "Some physico-chemical studies on fractions of dextran", Ark. Hemi. 1:61–80, 1949). Liquid culture (3.0 mL) was centrifuged at $17,000 \times g$ at 0° C. for thirty minutes to remove bacterial cells. The supernatant (3.0 mL) was added to absolute ethanol (11.0 mL) mixed thoroughly and placed in a −2° C. freezer for one hour. The chilled solution was then centrifuged again at $17,000 \times g$ at 0° C. for 30 minutes and the supernatant discarded. The pellet (precipitated protein and carbohydrate based polymers) was resuspended in distilled water (3.0 mL) and assayed for reducing sugars using standard techniques such as described in M. Dubois, K. A. Gilles, J. K. Hamilton, D. A. Rebers, and F. Smith: "Colorimetric method for determination of sugars and related substances". Anal. Chem. 28: 350–356, 1956. The amount of biopolymer was calculated by the difference in the amount of reducing sugar found in the sample relative to a control consisting of uninoculated medium.

The results of this screening are shown in Table 3. All the bacterial strains tested showed some control of exopolymer formation depending on which sugar(s) was used for growth. In particular two bacterial strains, 18-1 and 824-1, showed very large reductions in exopolymer formation by shifting from growth on sucrose to growth on glucose and fructose. Accordingly, the exopolymer production of the 18-1 and 824-1 strains is controllable to a large extent by the addition or deletion of sucrose.

Tests with the rod bacteria of Example 1 showed generally less satisfactory exopolymer control.

TABLE 2

Liquid Growth Medium A

The medium is based on synthetic brine made according to the analyzed chemical composition of the co-produced brine received from the Golden Lake oil field in Lloydminster, A5-14-48-23W3, June 10, 1981.

| Synthetic Brine: | |
|---|---|
| NaCl | 56.42 g |
| NaF | 0.04 g |
| KNO$_3$ | 0.19 g |
| CaCl$_2$.2H$_2$O | 1.15 g |
| MgCl$_2$.6H$_2$O | 5.55 g |
| BaCl$_2$.2H$_2$O | 0.10 g |
| Distilled water to 1 liter | |
| Growth Medium (ingredients per liter): | |
| K$_2$HPO$_4$ | 0.7 g |
| KH$_2$PO$_4$ | 0.3 g |
| (NH$_4$)$_2$SO$_4$ | 1.0 g |
| FeSO$_4$ | 0.005 g |
| ZnSO$_4$ | 0.002 g |
| MnSO$_4$ | 0.001 g |
| CoCl$_2$ | 0.001 g |
| (NH$_4$)$_6$Mo$_7$O$_{24}$.4H$_2$O | 0.0011 g |
| Na$_2$B$_4$O$_7$ | 0.001 g |
| CdSO$_4$ | 0.001 g |
| CuSO$_4$ | 0.0007 g |
| Difco Yeast Extract (Trademark) | 0.02 g |
| Cysteine HCl | 0.25 g |
| Difco Nutrient Broth (Trademark) | 16.0 g |
| Difco Brain Heart Infusion (Trademark) | 3.0 g |
| Synthetic brine (above) | 500 mL |
| Distilled water | 500 mL |

TABLE 3

Exopolymer Formation

Exopolymer Formed (mg/mL culture)

| Bacterial Strain | Growth Medium A +1% (w/v) Sucrose | Growth Medium A +0.5% (w/v) Glucose +0.5% (w/v) Fructose |
|---|---|---|
| 18-1 | 2.20 | 0.25 |
| 824-1 | 2.00 | 0.25 |
| 8529-1 | 2.10 | 0.90 |
| 527-3A | 2.00 | 1.90 |
| 5-1 | 3.40 | 1.0 |

DESCRIPTION OF THE MODEL CORE SYSTEM

In the following

(i) Model Core Preparation

Glass bead cores were produced to provide a continuous porous medium for plugging studies by the method of Shaw (Shaw (Chin), Jerry, M.Sc. Thesis, 1982, University of Calgary, Calgary Alberta). Random packing of uniform Blast-O-Lite Industrial glass beads (90 μm) (Trademark of Flexolite of Canada Ltd.) was achieved by pouring glass beads into Pyrex (Trademark) vials (internal diameter 1 cm) to a depth of 5.0 cm under agitation by an ultrasonic vibrator (Bransonic). The beads were then fused by incubation at 700° C. for 150 minutes and allowed to cool overnight. The solid core was liberated from the glass vial by shattering the vial.

The average throat size of the pore system was 16 μm and average porosity was 36% which gives an average pore volume per core of 1.5 cm$^3$ (Shaw, supra). Permeability was usually about 6 Darcies (Shaw, supra).

The cores were sterilized with ethylene oxide immediately prior to use. After sterilization, the core was degassed and flooded with the test medium as follows. The core was balanced over a beaker of sterile test fluid in a bell jar, and degassed under vacuum (less than 100μ) for at least 30 minutes. The core was then tipped into the test fluid and allowed to sit under vacuum for 5 minutes. The vacuum was released and the core stored in the test fluid until inserted in the core holder as described below.

(ii) Apparatus

The complete model core study apparatus consisted of an anaerobic reservoir modified from the system of J. Shaw (FIG. 1), a core holder assembly (FIG. 2), and a volumetric collection vessel (not shown). The body of the anaerobic reservoir 1 was made from 25 cm internal diameter PVC (1 cm thick) and supplied with a magnetic stirrer 3. The top 2 was removable and formed a pressure seal with the body by way of a rubber O-ring. The reservoir for bacterial cultures (FIG. 1) was connected to the stainless steel core holder (FIG. 2) by tygon tubing during the run.

(iii) Apparatus Assembly and Operation

Figures 1, 2, 3:
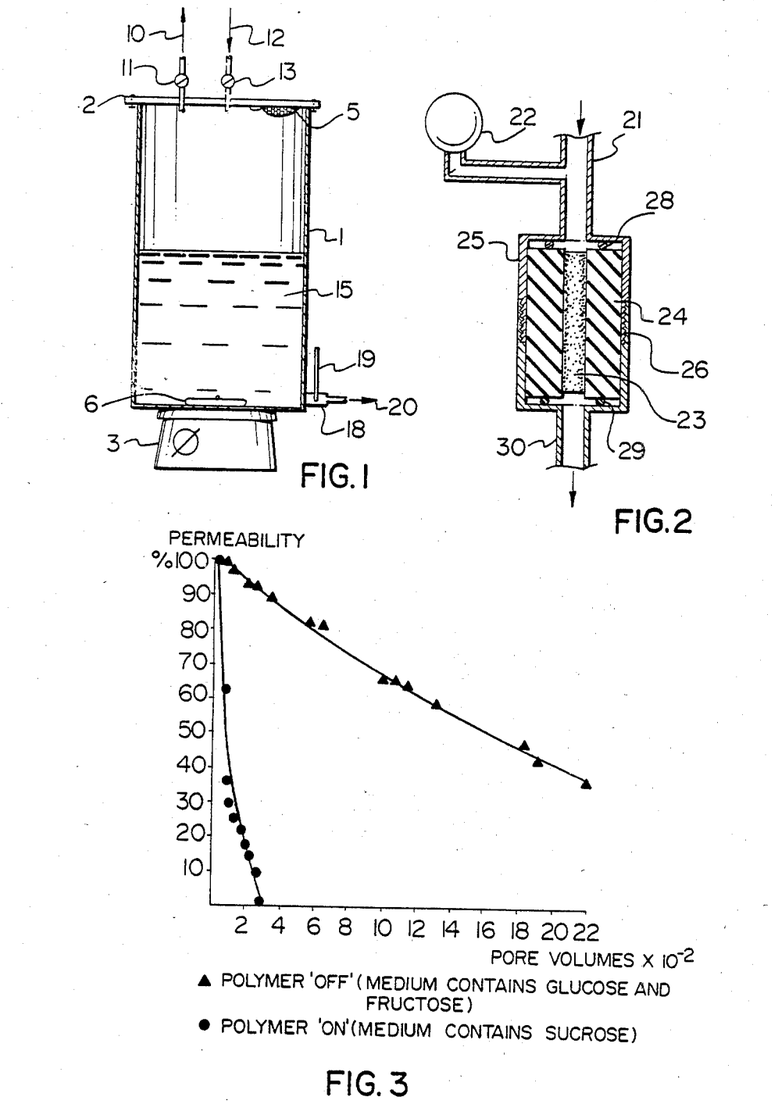
FIG. 1 is a diagrammatic view of a preferred embodiment of an anaerobic reservoir for core plugging studies according to the invention.
FIG. 2 is a diagrammatic view of a core holder for core plugging studies.
FIGS. 3 and 4 are diagrams showing the relation between permeability and pore volume in a test core treated according to the invention.

The reservoir 1 (FIG. 1) was sterilized with 70% ethanol while the rest of the equipment was sterilized with ethylene oxide. The reservoir was fitted with sterile palladium catalyst 5 and a stirring bar 6, then sealed. The reservoir was then alternately evacuated via line 10 and valve 11, flushed several times via line 12 and valve 13 with oxygen-free mixed gas of 90% $N_2$, 5% $CO_2$, 5% $H_2$ (Medigas) and left evacuated (15 inches Hg). The appropriate bacterial culture 15 was then sucked into the reservoir through the exit port 18 which was supplied with a thermometer 19. The unit was repressurized with mixed gas after pinching off the Tygon (Trademark) tubing attached to the exit port. A tube filled with Lucas semisolid anaerobic indicator (A. T. Willis: "Techniques for the study of anaerobic spore-forming bacteria". Pages 80–115 in *Methods in Microbiology*. J. R. Norris and D. W. Ribbons, ed's, Volume 3B, Academic Press, New York, 1969) was attached to one of the entry ports on the top of the unit to monitor for oxygen contamination of the reservoir. The prepared core was removed from its beaker of test fluid, wrapped in sterile Teflon (Trademark) tape, and coated with sterile vacuum grease. The thus prepared core 23 (FIG. 2) was placed in a rubber sleeve 24. The core and sleeve together were then placed in the sterilized stainless steel core holder 25. The two parts of the core holder 25 were joined together at 26 so that seals were established by way of rubber O-rings 28, 29. Following this the core was filled with test fluid from the reservoir by a length of Tygon tubing connecting line 20 (FIG. 1) with line 21 (FIG. 2). Line 21 was provided with a pressure gauge 22. Line 30 connected the core with a collection vessel (not shown).

The total unit was placed under a positive pressure of mixed gas (3.5 psi) and the run commenced at room temperature. Pressure, temperature and flow rates were monitored throughout the run. Viscosities of the test fluids were determined at ambient temperature by a Canon-Fenske viscometer. Permeabilities were determined according to Darcy's Law.

Data were plotted as % reduction in initial permeability versus pore volumes of test fluid passed through the core (FIG. 3).

EXAMPLE 3

Bacterial strain 18-1, which is capable of growing under aerobic and anaerobic conditions, was grown anaerobically at between 28° and 35° C. in a Forma Scientific Model 1024 anaerobic work station in a liquid medium of the composition shown in Table 2 containing either 1.0% sucrose (medium that supports exopolymer formation: polymer "on") or 0.5% fructose and 0.5% glucose (medium that inhibits exopolymer formation: polymer "off"). The initial pH of the bacterial culture was near neutral. The culture was maintained at $E_H$ values of between about −51 and −420 mV, since the resazurin based indicator used to detect oxygen leaks in the anaerobic reservoir responded to $E_H \sim -51$ mV and the reservoir catalyst operates at an $E_H$ of −420 mV. The bacteria were grown to a final cell concentration of $3 \times 10^8$/mL. The bacterial suspensions were passed at room temperature separately through the model glass bead core described above and the permeability of the core was measured over time. The pressure drop over a distance of 5 cm amounted to 3.5 psi. The results which are shown in FIG. 3 indicate that the strain, when grown in liquid medium containing sucrose and therefore producing large amounts of exopolymer, reduces the permeability of the core drastically on injection, even though its viscosity was below 5 cp, while the strain when grown in liquid medium containing fructose and glucose and therefore producing little or no exopolymer reduces core permeability much less on injection.

EXAMPLE 4

Pre-Induction of Exopolymer-Producing Enzyme System

To determine whether addition of trace amounts of sucrose to the medium in which a bacterial strain with an inducible exopolymer-producing enzyme system is grown influences the rate of subsequent exopolymer formation, the following experiment was performed.

Figure 4:
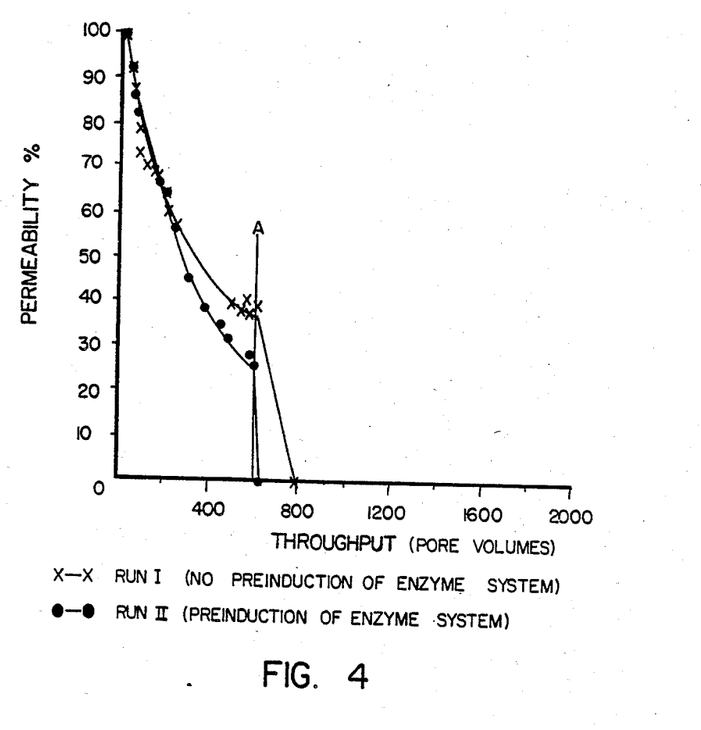

*Leuconostoc mesenteroides* NRRL B-523 was used. In this strain the exopolymer production is triggered by sucrose, the exopolymer produced is dextran and the inducible enzyme involved is dextransucrase. In run I strain B-523 was grown anaerobically in liquid medium A shown in Table 2 which contained 0.5% fructose and 0.5% glucose. The culture was incubated at 30° C. for 72 hours. The resulting cell suspension had a density of between $10^8$ and $10^9$ cells/mL. Under a pressure of 3.5 psi 600 pore volumes of the cell suspension were injected into the model glass bead core described above. The change in permeability in relation to the amount of cell suspension passing through the core was measured and is illustrated in the diagram of FIG. 4. When point A in the diagram was reached, injection of cell suspension was stopped and medium A containing 2% sucrose was passed through the core under gravity flow at 25° C. Complete plugging of the core occurred after passage of 220 core volumes of the sucrose containing medium through the core.

In run II the B-523 strain was grown anaerobically in medium A containing 2% fructose and 0.01% sucrose. The culture was incubated at 30° C. for 24 hours to a density of between $10^8$ and $10^9$ cells/mL. Again 600 pore volumes of the cell suspension were injected into the core. At point A in FIG. 4 injection of cell suspension was stopped and medium A containing 5% sucrose was passed through the core under gravity flow. Complete plugging of the core occurred after passage of only 5 pore volumes.

The results shown in FIG. 4 indicate that the rate of core plugging was much greater in run II than in run I. This is partly due to the higher sucrose concentration used in run II (5% in run II, 2% in run I) which allows increased dextran formation. Mostly, however, the difference in the rate of plugging and, consequently, in the rate of dextran formation is due to the fact that the bacteria used in run II were grown in a medium containing trace amounts of sucrose which allows pre-induction of the dextransucrase in the cells. Once larger amounts of sucrose are made available to the bacteria such pre-induction of the dextran-forming enzyme system leads to more immediate availability of the enzyme and, consequently, to a higher rate of dextran formation than in the bacteria in which dextransucrase was not pre-induced.

EXAMPLE 5

Effect of Salinity, Temperature and pH On Exopolymer Production

Preparation and Storage of Stock Cultures

A stock culture of *Leuconostoc mesenteroides* NRRL B-523 was prepared by inoculating 1 mL of culture growing in sucrose medium into 100 mL of sterile growth medium in a 250 mL flask and incubating at 30° C. without shaking in a Forma Scientific Model 1024 anaerobic chamber. After 16 hours of incubation 0.25 g/L cysteine hydrochloride and 200 g/L glycerol were added to the culture. About 2 mL of the stock cultures were then distributed to separate sterile small screw-capped vials and stored at −80° C. These vials were used for inoculum preparation in the following experiment.

Growth and exopolymer production by strain B-523 were evaluated by inoculating 100 mL of growth medium A shown in Table 2 containing 2% sucrose in duplicate flasks with a 1% or 5% inoculum of stock culture. Preparation, inoculation and incubation were performed under anaerobic conditions. After incubation 10 to 25 mL samples were taken from duplicate flasks and analyzed for exopolymer production.

Isolation of Exopolymer

Two mL aliquots of cultures were centrifuged to separate two fractions: the supernatant and the residue. The residue containing the bacteria and the water-insoluble exopolymer was suspended in 2 mL hot 1N KOH, and mixed for 1 minute. The mixture was then kept at 45° C. for at least 30 minutes. The bacteria were removed by centrifugation. One mL of supernatant containing the exopolymer was acidified by adding 1 ml 1N acetic acid to pH 3 or 4. Exopolymers were precipitated by adding 2 mL 95% ethanol (final concentration equals 45 to 50%) at room temperature overnight. Purification by re-precipitation and washing was carried out. The absolute amount of water-insoluble exopolymer was determined as glucose by the known phenol-sulfuric acid colorimetric method.

Effect of Salinity

Figure 5:
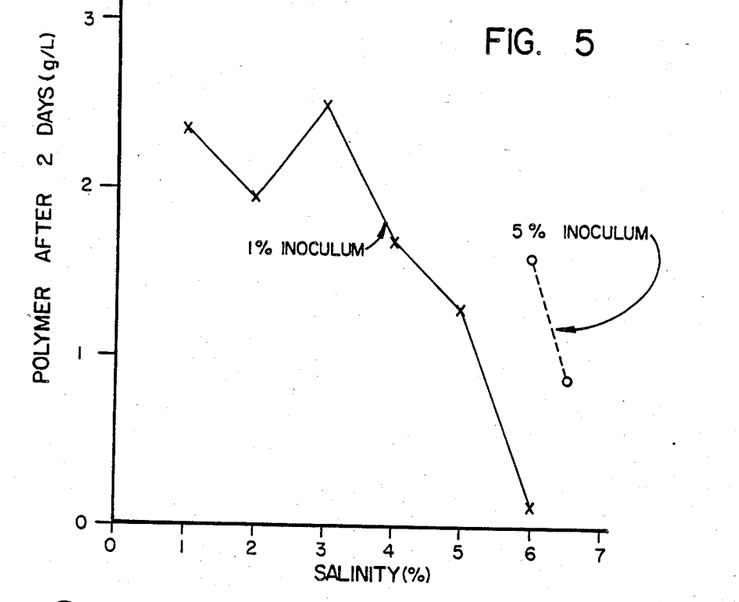
FIGS. 5, 6 and 7 are diagrams showing the relation between polymer production and salinity, temperature and pH, respectively.

Growth media based on medium A containing 2% sucrose were prepared with salinities ranging from 1 to 7%. Media having salinities of 1, 2, 3, 4, 5 and 6% were each inoculated with 1% stock culture and media having salinities of 6 and 6.5% were inoculated with 5% stock culture. The starting pH of the media was about 6.4. The media were not buffered during the test. The cultures were incubated for two days at 30° C. Samples of each culture were evaluated for exopolymer production. The results are illustrated in FIG. 5. It follows that under these conditions exopolymer production of *Leuconostoc mesenteroides* NRRL B-523 in culture inoculated with a relatively small number of cells decreases in media having salinities higher than 5% while exopolymer production in cultures inoculated with about 5 times more cells is still considerable, even in media having a salinity of 6.5%. It is believed that only a portion of cells of strain B-523 actually grows in media with high salinities while the rest does not sustain growth in high salinity media.

Effect of Temperature

Figure 6:
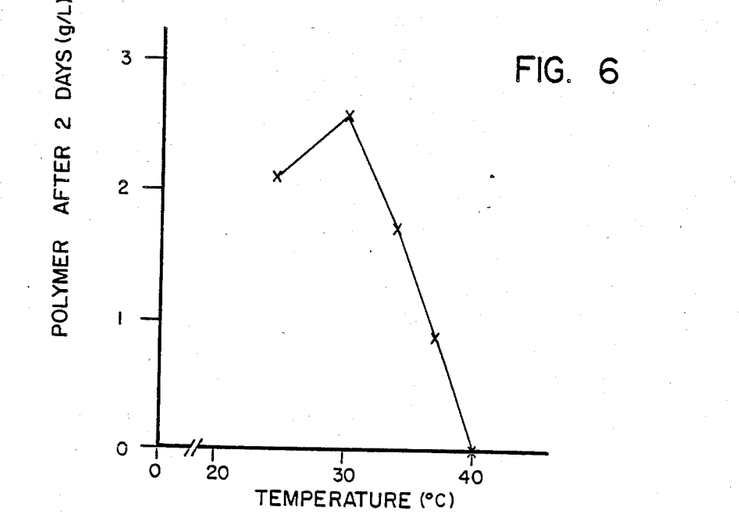

Flasks with medium A containing 2% sucrose and having a salinity of 3% were inoculated with 1% stock culture. The starting pH of the medium was about 6.4 and was not buffered during the tests. The cultures were incubated for 2 days at temperatures ranging from 25° to 40° C., specifically at temperatures of 25°, 30°, 35°, 37° and 40° C. Samples of each culture were evaluated for exopolymer production. The results are illustrated in FIG. 6. It follows that under the given conditions exopolymer production of strain B-523 is highest between about 25° and 35° C.

Effect of pH

Growth media based on medium A containing 2% sucrose and having a salinity of 3% were prepared with pH values ranging from 3.8 to 8.5. Media having pH values of 3.8, 5.5, 6.5, 7.5 and 8.5 were each inoculated with 1% stock culture. The cultures were incubated for 2 days at 30° C. The starting pH of the media was maintained by adding buffers as necessary. No buffer was needed to maintain the medium at pH 3.8. A 0.5M 2-N-morpholinoethane sulfonic acid buffer was used to maintain the culture at pH 5.5. A 0.5M morpholinopropane sulfonic acid buffer was added to the culture to maintain its pH at 6.5. A 0.5M tris-hydroxymethylmethylaminopropane sulfonic acid buffer was added to maintain the starting pH of the cultures at pH 7.5 or 8.5. All three buffers had previously been shown to be non-toxic up to 0.5M.

Figure 7:
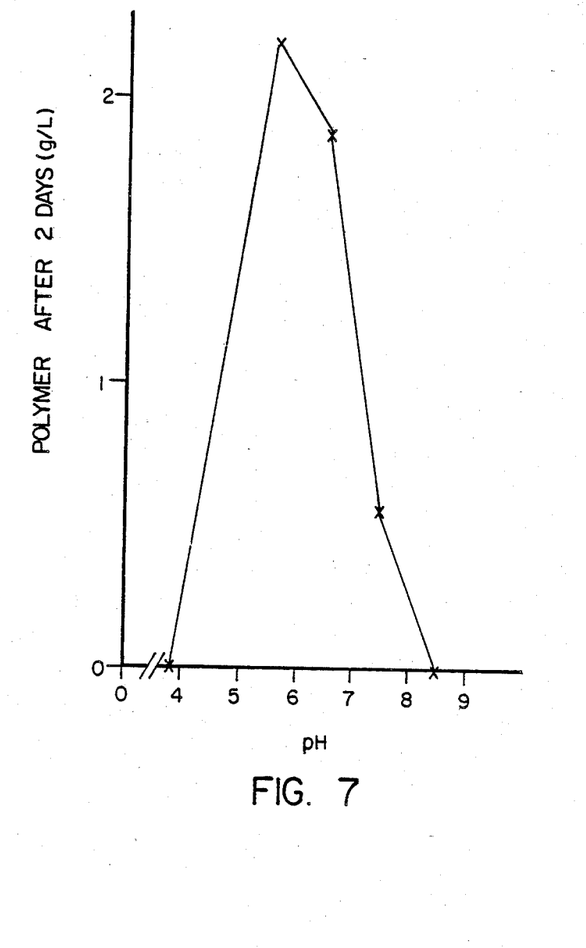

Samples of each culture were evaluated for exopolymer production. The results are illustrated in FIG. 7. It follows that under the given conditions exopolymer production of strain B-523 is highest at pH values between about 4 and 7.

EXAMPLE 6

Exopolymer Production in Low Sucrose Media

*Leuconostoc mesenteroides* NRRL B-523 and *Leuconostoc mesenteroides* NRRL B-1433 were separately grown in growth media C shown in Table 4 containing 5% sucrose. In both strains the exopolymer production is triggered by sucrose and the exopolymer produced is a dextran compound. A loop full of each culture was transferred onto solid 2% agar media which were prepared with medium B and contained between 0.001% and 0.5% sucrose. The inoculated plates were incubated for 2 days at 30° under anaerobic conditions. The plates were then observed to see whether any exopolymer was visible with the naked eye. The results shown in Table 5 illustrate that at sucrose concentrations in the growth medium of between about 0.001% and 0.04% these Leuconostoc strains do not produce any visible amount of dextran exopolymer. On the other hand, it has been found that the same low concentration of sucrose in the growth medium is sufficient to pre-induce the dextran-producing enzyme in these strains.

TABLE 4

| Liquid Growth Media B and C | | |
|---|---|---|
| Ingredients per Liter | Medium B | Medium C |
| Difco Brain Heart Infusion (Trademark) | 1.5 g | 1.5 g |
| Difco Nutrient Broth (Trademark) | 8 g | 8 g |
| Difco Yeast Extract (Trademark) | 0.02 g | 0.02 g |
| Cysteine.HCl | 0.25 g | 0.25 g |
| Sucrose | 0–0.33 g | 20–50 g |
| Fructose | 20–50 g | 0 g |
| Synthetic brine (see Table 2) | 500 ml | 50 ml |
| Distilled water | 50 ml | 500 ml |

TABLE 5

| | Visible Exopolymer Produced by *Leuconostoc mesenteroides* Strains | | | | | |
|---|---|---|---|---|---|---|
| | Amount of Sucrose added to Medium B | | | | | |
| Strain | 0.001% | 0.005% | 0.01% | 0.015% | 0.033% | 0.5% |
| NRRL B-523 | — | — | — | — | — | + |

TABLE 5-continued

| | Visible Exopolymer Produced by *Leuconostoc mesenteroides* Strains | | | | | |
|---|---|---|---|---|---|---|
| | Amount of Sucrose added to Medium B | | | | | |
| Strain | 0.001% | 0.005% | 0.01% | 0.015% | 0.033% | 0.5% |
| NRRL B-1433 | — | — | — | — | — | + |

EXAMPLE 7

Sucrose Utilization in High Sucrose Media

*Leuconostoc mesenteroides* NRRL B-523 was grown anaerobically in a medium based on medium B for 18 hours until a cell concentration of between $10^8$ and $10^9$ cells/mL was reached. This culture, which was in the stage of exponential growth, was used to inoculate growth media based on medium C containing sucrose in amounts ranging from 10% to 35%. The media contained neither fructose nor glucose. Samples of 100 mL of media containing 10, 20, 30 and 35% sucrose were inoculated with 0.1 mL inoculum. No buffer was used. The sample cultures were incubated anaerobically for 11 days at 30° C. At the end of the incubation period the exopolymer was separated for 10 minutes at 10,000 rpm in a Sorvall RC2B centrifuge. The precipitate was dried at 160° C. for 48 hours and then weighed. The sucrose, fructose and glucose contents were determined gas chromatographically according to procedures known in the art.

The results are shown in Table 6. The difference between the concentration of sucrose in the medium and the concentration present at the end of the incubation period is shown as "Sucrose Used" in column 4 of Table 6. The calculations of the theoretically possible dextran yield shown in column 9 of the Table was based on the initial amount of sucrose shown in column 2 and not on the amount of sucrose actually used. At 10% sucrose concentration the portion of the available sucrose which was broken down is higher than at higher sucrose concentrations. The concentration of exopolymer actually formed, on the other hand, is greatest at 20% sucrose (see columns 7 and 8). From column 6 it follows that not all of the glucose resulting from the breakdown of sucrose is utilized in the dextran formation. Overall, it appears that under the above conditions the utilization of sucrose is greatest in media containing about 10% sucrose.

TABLE 6

| Sucrose Utilization Data for High Sucrose Media | | | | | | | | |
|---|---|---|---|---|---|---|---|---|
| Sucrose Conc. | Initial Sucrose Conc. | Final Sucrose Conc. | Sucrose Used | Final Fructose Conc. | Final Glucose Conc. | Dry Weight of Exopolymer | | Exopolymer Yield (theoretical)[1] |
| % | mM | mM | mM | mM | mM | g/L | mM | % |
| 10 | 292.1 | 3.77 | 288.3 | 406.0 | 204.8 | 22.3 | 13.75 | 48 |
| 20 | 584.3 | 321.4 | 262.2 | 246.2 | 82.1 | 33.8 | 20.84 | 36 |
| 30 | 876.4 | 657.3 | 219.1 | 136.1 | 69.4 | 18.8 | 11.59 | 13 |
| 35 | 1022.5 | 759.6 | 262.9 | 109.5 | 61.1 | 22.0 | 13.56 | 13 |

[1]Based on total sucrose available not sucrose utilized.

EXAMPLE 8

Exopolymer Production

*Leuconostoc mesenteroides* NRRL B-523 was grown anaerobically in liquid growth medium B shown in Table 4. The medium contained 0.003% sucrose which was found to pre-induce the dextransucrase in the bacteria without inducing production of any noticeable amount of exopolymer when tested according to the procedure of Example 6. After 18 hours a cell concentration of between $10^8$ and $10^9$ cells/mL was reached. Two pore volumes of this cell suspension, which was in the stage of exponential growth, were passed through each of two of the above described model glass bead cores. Immediately following this one core was loaded with two pore volumes of medium C containing 20% sucrose and the other core was loaded with two pore volumes of a 40% solution of sugar beet molasses in synthetic brine (see Table 2). As sugar beet molasses contains about 50% sucrose, the latter solution had a sucrose content of 20%. In addition to sucrose, sugar beet molasses contains sufficient nutrients to allow growth of the bacteria. The loaded cores were sealed and incubated at 22° C. for 72 hours. Production of dextran during this time by the bacteria in the two cores completely sealed the cores so that no subsequent flow of brine was possible even under 6 psi injection pressure. The results for both cores were substantially identical.

It follows that sugar beet molasses solution triggers exopolymer production and bacterial growth in situ in a core to substantially the same extent as a generally more expensive sucrose containing growth medium. In addition, the results show that a relatively small amount of sugar beet molasses solution can effectively plug the core.

We claim:

1. In the enhanced recovery of mineral oil by supplying a drive fluid to an oil-bearing underground formation, a method of reducing permeability of zones in the formation having higher permeability than surrounding zones comprising:
   (a) injecting into the underground formation microorganisms capable of producing substantially insoluble exopolymer by the action of an enzyme system in the presence of a trigger compound and capable of growing under conditions of oil-bearing underground formations, such that said microorganisms accumulate in said higher permeability zones, said microorganisms being injected in an aqueous medium substantially free of said trigger compound; and
   (b) injecting the trigger compound into the underground formation so as to enhance enzymatic production of exopolymer by said microorganisms, whereby the exopolymer reduces the permeability of said higher permeability zones.

2. A method as in claim 1 wherein the microorganisms supplied to the underground formation are grown and maintained in an aqueous growth medium substantially free of said trigger compound prior to their injection into the underground formation.

3. A method as in claim 2 wherein the enzyme system involved in exopolymer production by the microorganism is an inducible enzyme system and said growth medium contains trace amounts of said trigger compound so as to pre-induce the enzyme system involved in producing the exopolymer.

4. A method as in claim 3 wherein the growth medium contains said trigger compound in an amount sufficient to pre-induce the enzyme system involved in exopolymer production by the microorganism but not sufficient to allow noticeable production of exopolymer by said microorganism.

5. A method as in claim 4 wherein the growth medium contains said trigger compound in an amount of between 0.001 and 0.05% (w/v).

6. In the enhanced recovery of mineral oil by supplying a drive fluid to an oil-bearing underground formation, a method of reducing permeability of zones in the formation having higher permeability than surrounding zones comprising:
   (a) growing and maintaining microorganisms, which in the presence of a trigger compound are capable of producing substantially insoluble exopolymer by the action of an enzyme system and in the absence of said trigger compound substantially stop producing exopolymer and which are capable of growing under conditions of oil-bearing underground formations, in an aqueous growth medium which is substantially free of said trigger compound;
   (b) injecting said microorganisms generally in the stage of exponential growth under pressure into the underground formation in an aqueous medium substantially free of said trigger compound;
   (c) injecting into the underground formation a fluid substantially free of said trigger compound so as to cause said microorganisms to accumulate in said higher permeability zones, said fluid being selected from the group consisting of drive fluid and growth media; and
   (d) injecting said trigger compound in an aqueous medium containing growth-supporting nutrients into the underground formation so as to trigger enzymatic production of exopolymer by said microorganisms and enhance growth of said microorganisms in situ, whereby the amount of exopolymer produced controls the permeability of said higher permeability zones.

7. A method as in claim 6 wherein the growth medium contains said trigger compound in an amount of between 0.001 and 0.05% (w/v).

8. A method as in claim 6 or 7 wherein said microorganisms are injected into the underground formation in said aqueous growth medium.

9. A method as in claim 6 wherein the drive fluid is water.

10. A method as in claim 6 wherein the microorganisms are bacterial strains the exopolymer production of which is triggered by sucrose, and wherein said trigger compound is injected into the underground formation in an amount sufficient to reach an in situ sucrose concentration of between about 1 and 35% (w/v) in the aqueous medium.

11. A method as in claim 10 wherein said bacterial strains are injected into the underground formation in an amount sufficient to reach an in situ density of between about $10^4$ and $10^9$ cells/mL aqueous medium.

12. In the enhanced recovery of mineral oil from an oil-bearing underground formation penetrated by spaced injection and production wells by introducing into said formation a drive fluid via said injection well, a method of reducing permeability of zones in the formation having higher permeability than surrounding zones comprising:
   (a) introducing via said injection well into the underground formation microorganisms, capable of producing substantially insoluble exopolymer by the action of an enzymatic system in the presence of a trigger compound and capable of growing under conditions of oil-bearing underground formations, such that said microorganisms accumulate in said higher permeability zones, said microorganisms being introduced into the underground formation in an aqueous medium substantially free of said trigger compound; and (b) introducing via said production well into the underground formation the trigger compound so that the trigger compound reaches the microorganisms in the underground formation and triggers enzymatic production of exopolymer by said microorganism, said exopolymer reducing the permeability of said higher permeability zones.

13. A method as in claim 12 wherein the microorganisms supplied to the underground formation are grown and maintained in an aqueous growth medium substantially free of said trigger compound prior to their injection into the underground formation.

14. A method as in claim 6 or 13 wherein the enzyme system involved in exopolymer production by the microorganism is an inducible enzyme system and said growth medium contains trace amounts of said trigger compound so as to pre-induce the enzyme system involved in producing the exopolymer.

15. A method as in claim 6 or 13 wherein the growth medium contains said trigger compound in an amount sufficient to pre-induce the enzyme system involved in exopolymer production by the microorganism but not sufficient to allow noticeable production of exopolymer by the microorganism.

16. A method as in claim 2 or 13 wherein the microorganisms are bacterial strains the exopolymer production of which is triggered by sucrose, and wherein said bacterial strains are injected into the underground formation generally in the stage of exponential growth.

17. A method as in claim 12 wherein the trigger compound is introduced into the underground formation via said injection well.

18. A method as in claim 17 wherein the microorganisms supplied to the underground formation are grown and maintained in an aqueous growth medium substantially free of said trigger compound prior to their injection into the underground formation.

19. A method as in claim 12 wherein the microorganisms are introduced into the underground formation via said production well.

20. A method as in claim 1 or 2 wherein said trigger compound is injected into the underground formation in an aqueous medium containing growth-supporting nutrients so as to enhance production of exopolymer by said microorganisms and enhance growth of said microorganisms in situ.

21. A method as in claim 1, 6 or 12 wherein the drive fluid is selected from the group consisting of water, aqueous solutions, microemulsions and micellar suspensions based on water and hydrocarbons, and drive gases.

22. A method as in claim 1, 6 or 12 wherein the microorganisms are bacterial strains the exopolymer production of which is triggered by sucrose.

23. In the enhanced recovery of mineral oil by supplying a drive fluid to an oil-bearing underground formation, a method of reducing permeability of zones in the formation having higher permeability than surrounding zones comprising:

(a) injecting into the underground formation in a substantially sucrose-free aqueous medium bacteria capable of producing substantially insoluble exopolymer by the action of an enzyme system in the presence of sucrose and capable of growing under conditions of oil-bearing underground formations, such that said bacteria accumulate in said higher permeability zones; and (b) injecting sucrose in an aqueous medium into the underground formation so as to enhance enzymatic productin of exopolymer by said bacteria, whereby the exopolymer reduces the permeability of said higher permeability zones.

24. A method as in claim 23 wherein the bacteria supplied to the underground formation are grown and maintained in an aqueous substantially sucrose-free growth medium prior to their injection generally in the stage of exponential growth into the underground formation.

25. A method as in claim 24 wherein the enzyme system involved in exopolymer production by the bacteria is an inducible enzyme system and said growth medium contains trace amounts of sucrose so as to pre-induce the enzyme system involved in producing the exopolymer.

26. A method as in claim 25 wherein the growth medium contains sucrose in an amount sufficient to pre-induce the enzyme system involved in exopolymer production by the bacteria but not sufficient to allow noticeable production of exopolymer by the bacteria.

27. A method as in claim 26 wherein the growth medium contains sucrose in an amount of between 0.001 and 0.05%.

28. In the enhanced recovery of mineral oil by supplying a drive fluid to an oil-bearing underground formation, a method of reducing permeability of zones in the formation having higher permeability than surrounding zones comprising:

(a) growing and maintaining in an aqueous substantially sucrose-free growth medium bacteria which in the presence of sucrose are capable of producing substantially insoluble exopolymer by the action of an enzymatic system and in the absence of sucrose substantially stop producing exopolymer and which are capable of growing under conditions of oil-bearing underground formations;

(b) injecting said bacteria generally in the stage of the exponential growth in a substantially sucrose-free aqueous medium under pressure into the underground formation;

(c) injecting a substantially sucrose-free aqueous medium into the underground formation so as to cause said bacteria to accumulate in said higher permeability zones; and (d) injecting sucrose in an aqueous medium containing growth-supporting nutrients into the underground formation so as to trigger enzymatic production of exopolymer by said bacteria and enhance their growth in situ, whereby the amount of exopolymer produced controls the permeability of said higher permeability zones.

29. A method as in claim 28 wherein the growth medium contains sucrose in an amount of between 0.001 and 0.05% (w/v).

30. A method as in claim 28 or 29 wherein said bacteria are injected into the underground formation in said aqueous growth medium.

31. A method as in claim 28 wherein the drive fluid is water.

32. In the enhanced recovery of mineral oil from an oil-bearing underground formation penetrated by spaced injection and production wells by introducing into said formation a drive fluid via said injection well, a method of reducing permeability of zones in the formation having higher permeability than surrounding zones comprising:
  (a) introducing via said injection well into the underground formation in a substantially sucrose-free aqueous growth medium bacteria capable of being trigger by sucrose to produce substantially insoluble exopolymer by the action of an enzyme system and capable of growing under conditions of oil-bearing underground formations, such that said bacteria accumulate in said higher permeability zones; and
  (b) introducing via said production well sucrose in an aqueous medium into the underground formation so that the sucrose reaches the bacteria in the underground formation and triggers enzymatic production of exopolymer by said bacteria, said exopolymer reducing the permeability of said higher permeability zones.

33. A method as in claim 32 wherein the bacteria supplied to the underground formation are grown and maintained in an aqueous substantially sucrose-free growth medium prior to their injection generally in the stage of exponential growth into the underground formation.

34. A method as in claim 28 or 33 wherein the enzyme system involved in exopolymer production by the bacteria is an inducible enzyme system and said growth medium contains trace amounts of sucrose so as to pre-induce the enzyme system involved in producing the exopolymer.

35. A method as in claim 28 or 33 wherein the growth medium contains sucrose in an amount sufficient to pre-induce the enzyme system involved in exopolymer production by the bacteria but not sufficient to allow noticeable production of exopolymer by the bacteria.

36. A method as in claim 24, 28 or 33 wherein said bacteria are injected into the underground formation in an amount sufficient to reach an in situ density of between about $10^4$ and $10^9$ cells/mL aqueous medium.

37. A method as in claim 25, 28 or 33 wherein said bacteria are selected from one or more *Leuconostoc mesenteroides* strains.

38. A method as in claim 32 wherein the sucrose is introduced into the underground formation via said injection well.

39. A method as in claim 38 wherein the bacteria supplied to the underground formation are grown and maintained in an aqueous substantially sucrose-free growth medium prior to their injection generally in the stage of exponential growth into the underground formation.

40. A method as in claim 32 wherein the bacteria are introduced into the underground formation via said production well.

41. A method as in claim 23 or 32 wherein sucrose is injected into the underground formation in an aqueous medium containing growth-supporting nutrients so as to trigger production of exopolymer by said bacteria and enhance their growth in situ.

42. A method as in claim 23, 28 or 32 wherein sucrose is injected into the underground formation in an amount sufficient to expose the bacteria in the formation to sucrose concentration of between about 1 and 35% (w/v) in the aqueous medium.

43. A method as in claim 23, 28 or 32 wherein sucrose is injected into the underground formation in form of a molasses solution.

44. A method as in claim 23, 28 or 32 wherein the drive fluid is selected from the group consisting of water, aqueous solutions, microemulsions and micellar suspensions based on water and hydrocarbons, and drive gases.

45. In the enhanced recovery of mineral oil by supplying water to an oil-bearing underground formation, a method of reducing permeability of zones in the formation having higher permeability than surrounding zones comprising:
  (a) growing and maintaining in an aqueous growth medium at least one *Leuconostoc mesenteroides* strain which in the presence of sucrose is capable of producing substantially insoluble dextran as exopolymer by the action of an enzymatic system and in the absence of sucrose substantially stops producing dextran and which is capable of growing under conditions of oil-bearing underground formations, said strain having as enzyme involved in dextran production dextransucrase which is an inducible enzyme and said growth medium containing between about 0.001 and 0.04% sucrose so as to pre-induce the dextransucrase without allowing noticeable production of dextran;
  (b) injecting said bacteria in the stage of exponential growth in said growth medium under pressure into the underground formation such that said bacteria accumulate in said higher permeability zones; and
  (c) injecting sucrose in an aqueous medium containing growth-supporting nutrients into the underground formation so as to trigger enzymatic production of dextran by said bacteria and enhance their growth in situ, whereby the amount of dextran produced controls the permeability of said higher permeability zones.

46. A method as in claim 45 wherein sucrose is injected into the underground formation in an amount sufficient to expose the bacteria in the formation to a sucrose concentration of between about 1 and 35% (w/v) in the aqueous medium.

47. A method as in claim 45 wherein sucrose is injected into the underground formation in an amount sufficient to reach an in situ sucrose concentration of between about 10 and 20% (w/v) in the aqueous medium.

48. A method as in claim 47 wherein said bacteria are injected into the underground formation in an amount sufficient to reach an in situ density of between about $10^7$ and $10^9$ cells/mL aqueous medium.

49. A method as in claim 48 wherein the *Leuconostoc mesenteroides* strain is *Leuconostoc mesenteroides* NRRL B-523.

50. A method as in claim 48 wherein the *Leuconostoc mesenteroides* strain is *Leuconostoc mesenteroides* NRRL B-1433.

51. A method as in claim 45 wherein said bacteria are injected into the underground formation in an amount sufficient to reach an in situ density of between about $10^4$ and $10^9$ cells/mL aqueous medium.

* * * * *